UNITED STATES PATENT OFFICE.

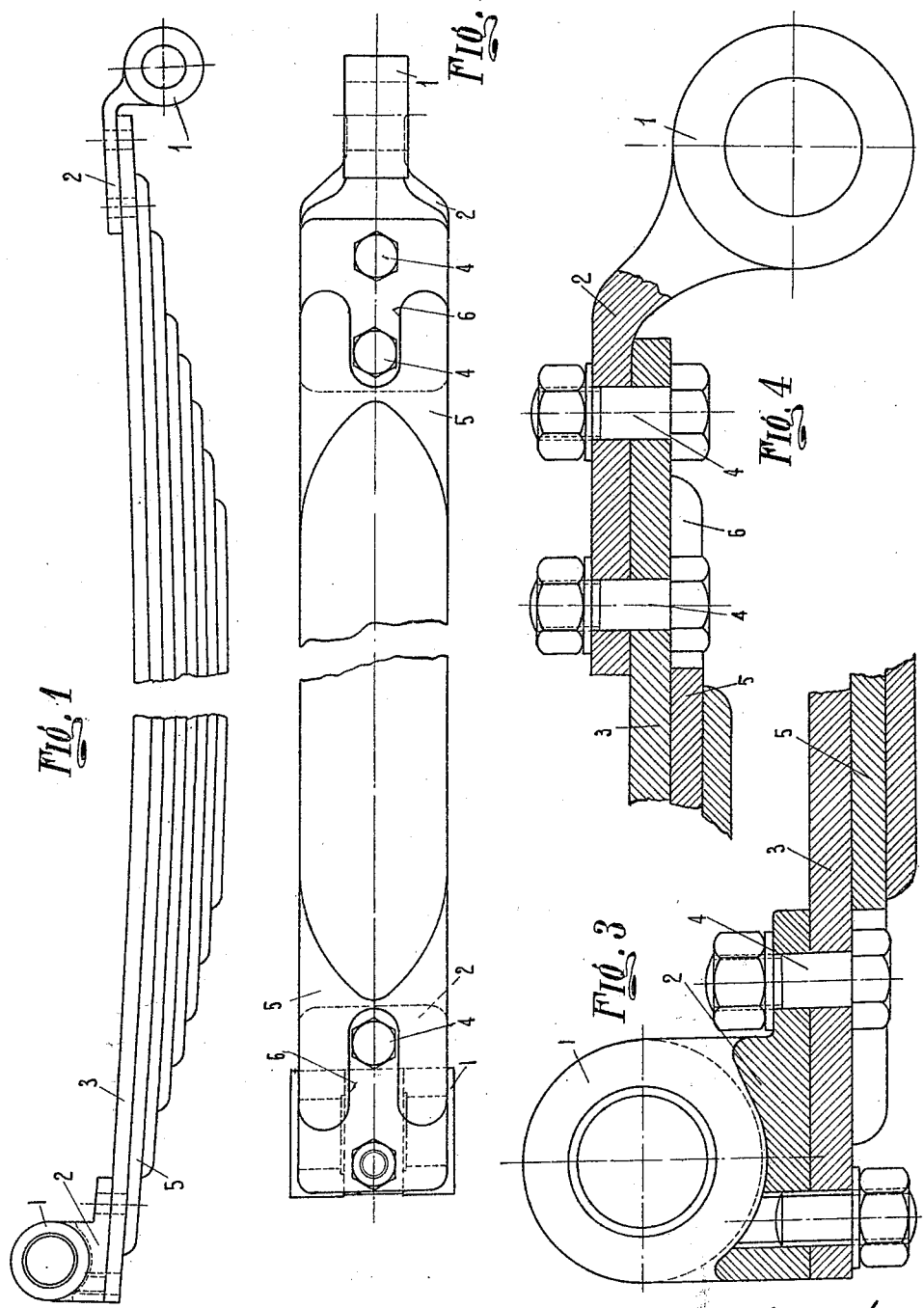

RODOLFO ZEPPEGNO, OF TURIN, ITALY, ASSIGNOR TO LANCIA & C., OF TURIN, ITALY, A COMPANY OF ITALY.

VEHICLE SPRING.

1,404,677. Specification of Letters Patent. Patented Jan. 24, 1922.

Application filed September 17, 1920. Serial No. 410,937.

*To all whom it may concern:*

Be it known that I, RODOLFO ZEPPEGNO, a subject of the King of Italy, and resident of Turin, Italy, have invented certain new and useful Improvements in Vehicle Springs, of which the following is a specification.

This invention relates to springs for vehicles and particularly for motor cars, and has for its object an arrangement for providing the ends of said springs with means for connecting them with the vehicle frame.

It is known that at present the springs are provided with connecting eyes which are obtained by upturning the ends of the main leaf of the spring. In this practice owing to the uneven thickness of the spring leaves which are obtained by rolling and to the inaccuracy of the eye obtained by forging the leaf end, it is necessary to drill the hole of said eye for properly seating therein a connecting pivot or a bushing; obviously by this operation the thickness and the strength of the leaf are reduced.

According to this invention the connecting means are provided by separate parts which may be worked or machined with the required accuracy and are then fastened on the ends of the main leaf of the spring.

On the annexed drawing is shown by way of example an embodiment of this invention; Figure 1 is the side view of a leaf spring having connecting means secured to it; Figure 2 is a fragmentary bottom view on an enlarged scale showing the ends of the spring; Figure 3 is the vertical section of one of said ends and Figure 4 is the vertical section of the other end.

As shown by said drawing each connecting member consists of a sleeve 1 having an extension 2 intended to be fastened on the main leaf of the spring.

Said extension 2 may have any proper shape for securing it to the main leaf of the spring with the sleeve 1 in proper position.

The member comprising the sleeve 1 and the extension 2 is preferably secured to the spring leaf 3 by locating said extension 2 on the upper face of said leaf and by inserting bolts 4 through registering holes of the leaf and of said extension.

The leaf 5 of the spring adjacent to the main leaf 3 is conveniently provided with a recessed portion 6 (Figures 2—3—4) providing a free space for the heads of bolts 4; said recessed portion has preferably a little larger width than said heads which are thus engaged within said recess and are prevented from rotating when the nut is screwed on the bolt.

This invention improves the construction of the springs for motor vehicles and provides means for mounting thereon connecting members fully complying with the requirements as to accuracy and strength.

It is to be understood that the connecting members may have any other shape than those illustrated, say they may be provided with pivots or studs instead of sleeves as illustrated.

What I claim as my invention and desire to secure by United States Letters Patent is:—

1. A laminated semi-elliptical leaf spring, comprising a main top leaf, a shackle eye disposed at each end of said main leaf, said eyes having integral therewith flat extensions superposed upon the end portions of said main leaf and a bolt extending through each extension and the main leaf, the heads of said bolts being disposed in slots in the ends of the second leaf whereby said bolts are prevented from turning and the main and second leaves are held in alignment.

2. A laminated semi-elliptic leaf spring, comprising a main top leaf projecting at its ends beyond the ends of the second leaf, a shackle eye disposed at each end of said main leaf, said eyes having integral therewith flat extensions superposed upon the end portions of said main leaf, and a pair of bolts extending through each extension and registering holes in the main leaf, said bolts being disposed in spaced relation in the longitudinal axis of the main leaf, the ends of the second leaf being slotted to receive the heads of the two bolts nearest the center of the spring whereby to prevent said bolts from turning and to maintain said main and second leaves in alignment.

3. A laminated semi-elliptic leaf spring, comprising a main top leaf projecting at its ends beyond the ends of the second leaf, a shackle eye disposed at each end of said main leaf, said eyes having integral therewith flat extensions projecting towards the middle of the spring and superposed upon the end portions of said main leaf, and a pair of bolts extending through each extension and registering holes in the main leaf, said bolts being disposed in spaced relation in the longitudinal axis of the main leaf, the ends of the second leaf being slotted to receive the heads of the two bolts nearest the center of the spring whereby to prevent said bolts from turning and to maintain said main and second leaves in alignment.

Signed at Turin, Italy, this 31st day of August, A. D. 1920.

RODOLFO ZEPPEGNO.